Sept. 10, 1968  K. G. HATCH  3,400,651
AUTOMATIC TOASTER
Filed Dec. 1, 1966  3 Sheets-Sheet 1
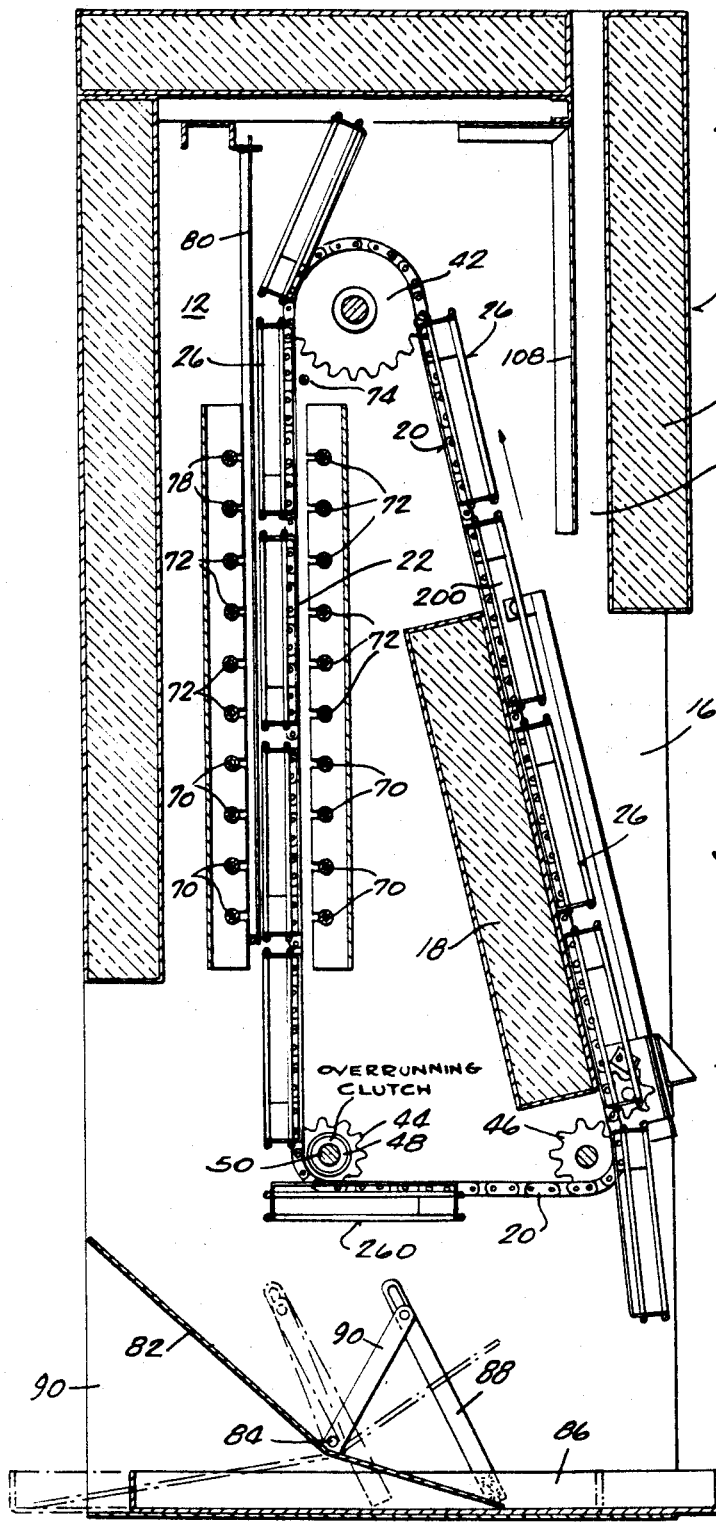
Fig. 1
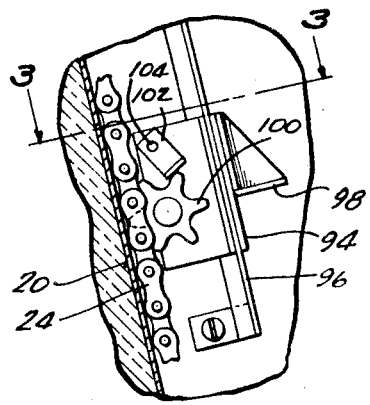
Fig. 3
Fig. 2
INVENTOR
KENNETH GORDON HATCH
BY Wheeler, Wheeler, House & Clemency
ATTORNEYS

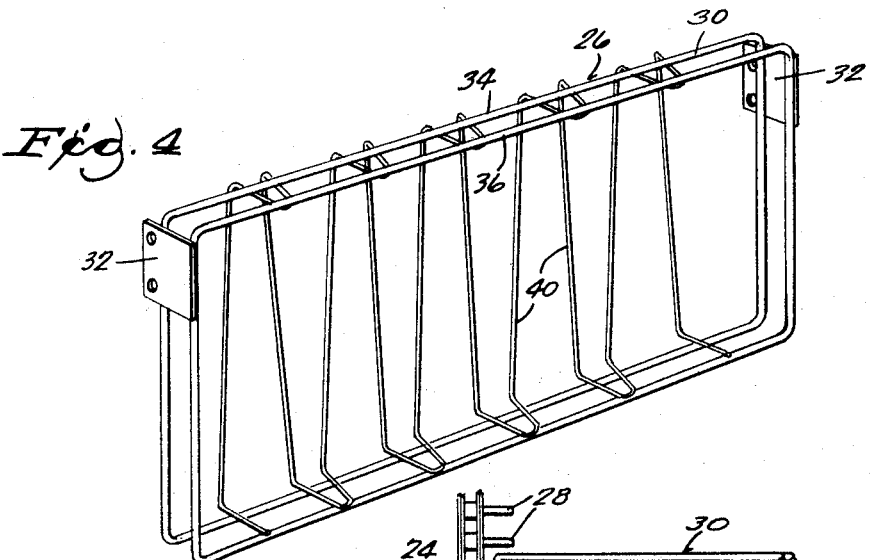
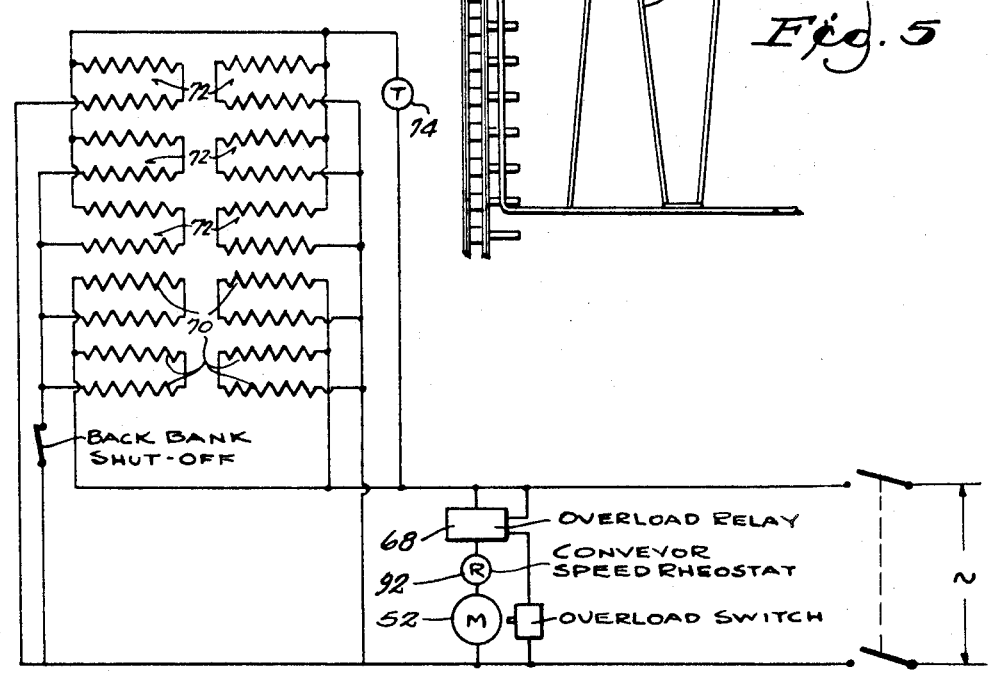

Sept. 10, 1968   K. G. HATCH   3,400,651
AUTOMATIC TOASTER

Filed Dec. 1, 1966   3 Sheets-Sheet 3

INVENTOR
KENNETH GORDON HATCH

BY Wheeler, Wheeler, House & Clemency
ATTORNEYS 3,400,651
AUTOMATIC TOASTER
Kenneth Gordon Hatch, Milwaukee, Wis., assignor to Hatco Corporation, Milwaukee, Wis., a corporation of Wisconsin
Filed Dec. 1, 1966, Ser. No. 598,339
14 Claims. (Cl. 99—331)

ABSTRACT OF THE DISCLOSURE

An endless conveyor carrier bread past radiant heaters to be toasted thereby. The heaters may be electric or gas. Various means are disclosed for turning some of the heaters on in anticipation of the arrival of bread to be toasted. During toasting operation, the desired degree of toasting is achieved by varying conveyor speed rather than the temperature of the heating elements.

A handle having limited reciprocation along the path of the conveyor is in permanent over-running clutch connection with the conveyor to enable the operator to accelerate movement of bread to the toasting zone by advancing the empty portions of the conveyor through said zone.

When toast is complete, it is deflected at will to either side of the apparatus into a reciprocable slide or tray which operates the deflector.

Background of the invention

The toaster herein disclosed includes improvements over the toasters shown in United States Patents 1,773,109 and 2,172,194. In general, the structure is similar to those patented but the venting and thermostatic control arrangements and conveyor advancing means, and some details of the toast receiver are different from anything shown in these prior patents.

Summary of the invention

The invention involves anticipatory energization of the radiant heating elements; a novel means of advancing empty portions of the conveyor past the heating elements to expedite movement to the toasting zone of bread placed on the conveyor; the control of toasting by varying conveyor speed; and selective deflection of the discharged toast toward delivery ports at either side of the machine.

Description of the invention

In the drawings:

FIG. 1 is a view in vertical front-to-rear section through a toaster embodying the invention.

FIG. 2 is an enlarged fragmentary detail view showing in elevation a fragment of one of the conveyor chains and the associated manually operable device for advancing the chain.

FIG. 3 is a view in section on line 3—3 of FIG. 2.

FIG. 4 is a fragmentary view in perspective showing one of the bread receiving racks.

FIG. 5 is a fragmentary detail view in front elevation showing the mounting of one end of the rack on one of the conveyor chains (the arrangement being similar at the other end).

FIG. 9 is a simplified wiring diagram showing how the device of FIG. 1 operates.

Figure 6:
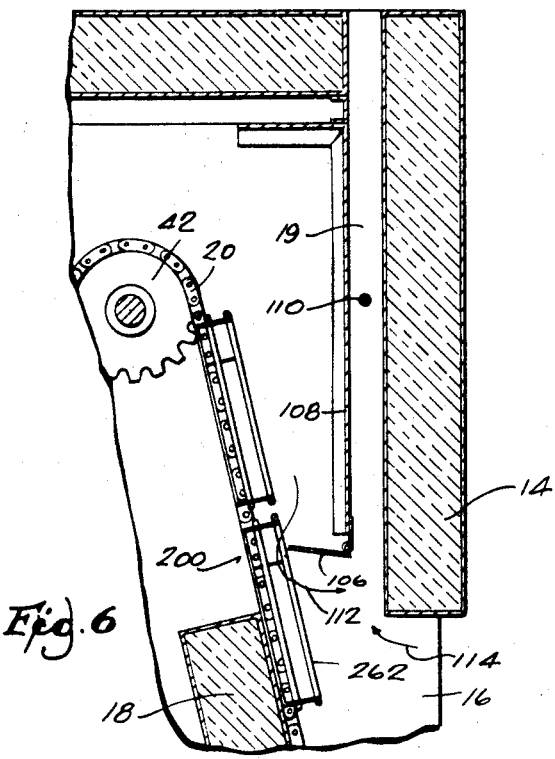
FIG. 6 is a fragmentary view similar to a portion of FIG. 1 showing a modified embodiment of the invention.

The toasting cabinet 10 has insulated walls enclosing a toasting chamber 12. The insulated panel 14 at the front of the cabinet terminates to provide an opening at 16 into which the operator may insert the bread to be toasted. At this point insulation is provided by means of a panel 18 which is inclined and spaced to lie at the rear of the opening 16. It is behind the path of the upwardly inclined flight 200 of an endless conveyor 20 which carries the bread into a toasting zone 22.

It will be understood that the side walls, as well as the top, bottom, front and rear walls, are desirably all insulated above the level of the front and rear openings.

Air heated in the toasting chamber 12 is desirably carried off through a flue 19. As the air rises in the flue, it is diluted by ambient air admitted through the front opening 16, which is entrained by, and commingled with, the hot air rising through the flue.

The conveyor 20 comprises laterally spaced chains 24 connected by bread supports which preferably comprise skeletonized baskets 26 made, for example, as shown in detail in FIGS. 4 and 5. In this organization, each of the chains 24 has projecting studs 28. The frame 30 of each of the baskets 26 is provided at corresponding corners with apertured plates 32 pivotally engaged by opposite studs 25. Each basket will swing out from the conveyor as the conveyor traverses its upper and lower guides. However, the basket sides rest against the studs to preclude pivotal movement otherwise.

The basket frame 30 consists of front and rear bars 34 and 36 which can be made of wire. The bottoms and fronts and backs of each basket are provided by a laced strand 40 of thin wire which supports the bread without materially obstructing the passage of radiant heat to the bread.

The conveyor chains 24 pass about upper sprockets 42 and lower sprockets 44 and 46. The sprocket 44 is connected by an overrunning clutch 48 with drive shaft 50 driven from motor 52 through a unitary reducing gear set 54. The output shaft 56 of the gear set carries a sprocket 58 connected by chain 60 with sprocket 62 on shaft 50.

Figure 8:
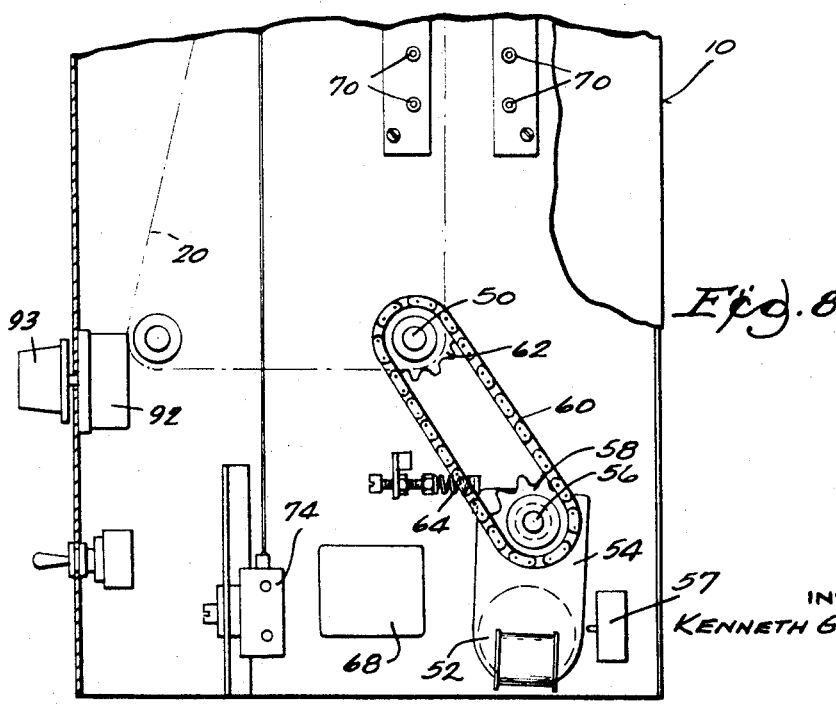
FIG. 8 is a fragmentary view of the toaster in side elevation, portions of a closure seal being removed.

The motor 52 and unitary reducing gear set 54 are mounted for pivotal movement on the axis of shaft 56. A compression spring 64, adjustable as to bias, tends to oscillate the pivoted unit slightly in a clockwise direction to the position as shown in FIG. 8 to hold it normally out of contact with microswitch 57. This switch is connected to a relay switch 68 in the motor circuit as a safety feature, the arrangement being such that if any unusual resistance develops as a result of an obstruction to movement of the conveyor, the reaction of sprocket 58 tends to oscillate the unit 52, 54 in a counterclockwise direction against the bias of spring 64 to open switch 57, thereby opening the control relay 68 to stop the motor.

Bread inserted through the opening 16 into the successive baskets 26 on conveyor 20 will be carried by the conveyor about the upper sprocket 42 in the top of the toasting chamber and will thence pass downwardly through the toasting zone 22 which is defined by parallel rows of radiant heating elements. These may be either electric or gas but are preferably of the resistance bar type. Some of the heating elements 70 at the lower ends of the front and rear rows may be left continuously warm. Four such continuously operated radiant elements 70 are shown but the number is not specifically important. While only electrical heating elements are shown, it will be understood that the showing is illustrative and is intended to include radiant gas-heated elements.

As shown in the diagram, an entire bank of elements (or most of the elements of such bank) may be cut out if the bread to be toasted comprises half-rolls or the like to be toasted on one side only.

Other similar elements 72 are turned off and on as required to maintain a predetermined temperature. The operation of these last mentioned elements is controlled by a thermostat 74 located above the toasting zone in a position where it will be exposed to the heat of convection air which has been heated by the elements 70 and is rising to the top of channel 12. However, the thermostat 74 is also exposed, in the absence of bread, to radiant heat from one or more of the heating elements 78 at the top of the row of elements lying at the rear of the toasting zone. At least one of elements 78 may be continuously operated if desired. If so, it may be connected in the same circuit as element 70. By way of example only, and not by way of limitation, the thermostat is set in practice to open the circuit to elements 72 and 78 when thermostat temperature reaches 525° F., and close the circuit at temperatures below that.

Regardless of whether an element 78 is operating, the entry of a basket 26 into the heating zone 22 beside the thermostat 74 will tend to absorb heat from the thermostat and obstruct delivery of convection heat thereto, whereupon the cooling of the thermostat 74 closes the circuit to the heating elements controlled thereby, thus, in effect, initiating the development of heat in these elements before the surfaces of the bread in the advancing basket 26 reach a position to be exposed to the radiation of these elements.

This anticipation of the requirements of the approaching bread greatly facilitates the toasting operation and makes it possible to achieve a proper degree of toasting with less travel through the toasting zone and less radiation in said zone than would otherwise be required.

The thermostat is intended to maintain the heat at a constant value. The degree of toasting is controlled preferably by varying the rate of movement of the bread through the toasting zone. This is accomplished by a rheostat which controls the speed of the conveyor driving motor as shown in the circuit diagram of FIG. 9.

Each basket 26 is entirely open at its front to receive the bread to be toasted. The inclination of the conveyor run 200 holds the bread in the basket as the bread moves upwardly toward sprocket 42. A wire or wires 80 at the rear of the heating zone 22 keeps the bread in the basket during the downward travel of each successive basket through the heating zone. At the bottom of the heating zone, the basket passes around the sprocket 44 as shown at 260 and discharges the finished toast onto the tiltable plate 82.

The present invention contemplates that the plate may be oscillated about its pintle 84 to deliver the toast into a receiving tray 86 which is slidable from front to rear in the cabinet 10 and connected by links 88 and 90 with the pintle 84 to oscillate the plate 82. The arrangement permits the toast to be discharged into either end of the tray 86 to facilitate withdrawal of toast either through the opening 16 at the front of the cabinet or the opening 90 at the rear.

*Operation*

The conveyor 20 may be in continuous operation but will not necessarily be carrying bread for toasting. Assuming that there are empty baskets above the receiving opening 16, the operator may desire to advance a given slice of bread into the toasting zone more rapidly than the conveyor would normally operate.

It will be understood that the conveyor speed is dictated by the amount of time required for proper toasting of a piece of bread during its traverse of the toasting zone. Varying the degree of toasting by varying rate of conveyor movement gives much better results than varying the thermostat setting. There is considerable lag when the thermostat is changed, whereas the response is immediate when the conveyor speed is changed. This speed is governed by a rheostat 92 having a control knob 93 accessible to the operator at the front of the machine to regulate operation of the conveyor driving motor 52. Hence, the speed may be increased or decreased according to the requirements of the particular bread to be toasted.

When the operator desires to accelerate a given slice of bread to the toasting zone, he may do so by manipulating a carriage 94 guided for movement along a way or rail 96 and provided with a handle 98 for the convenience of the operator. This carriage has a sprocket 100 mounted thereon, the sprocket being in permanent mesh with one of the chains 24. As shown in FIGS. 2 and 3, a dog 102 pivoted to the carriage engages a tooth of the sprocket to prevent sprocket rotation and thereby lock the carriage to the conveyor when the carriage is moved upwardly from the normal lower position in which it is shown in FIGS. 1 and 2. Thus, upward movement of the carriage by manipulation of the handle 98 will advance the conveyor in an upward direction to move to the top of the conveyor run 200 a basket in which bread has just been placed for toasting. Such movement of the conveyor is accommodated by the overruning clutch 48 between the drive shaft 50 and the conveyor-driving sprocket 44.

When the carriage 94 is released for gravity return, or is manually retracted, from its elevated position to the lower position in which it is shown in FIGS. 1 and 2, the dog 102 is pivoted out of the path of the sprocket teeth by the rotation of the sprocket. This permits the carriage to move downwardly without any effect on the conveyor chain. A pintle 104 mounts the dog 102 from the carriage to permit the dog to be pushed aside against its gravity base.

While the anticipatory energization of the heating elements 72 and/or 78 is preferably effected by means of but one thermostat located as shown at 74 in FIG. 1, FIG. 6 shows a supplemental anticipatory control means in which a short baffle 106 projects toward the conveyor run 200 from the partition 108 which forms the inside wall of the flue 19. The thermostat 110 which controls the anticipatory energization of the heating elements 72 and/or 78 is located in the flue. When the basket 262 is empty, the heated air passing from chamber 12 toward flue 19 can pass readily through the basket as indicated by the arrow 112. The thermostat 110 is thereby maintained at a temperature such that the heating elements at the top of the toasting zone are not energized. However, when basket 262 contains a slice of bread, the flow of hot air on the path indicated by the arrow 112 is obstructed, whereupon a greater proportion of ambient air enters the flue through the opening 16 on the path indicated by arrow 114. This cools the thermostat 110, whereby the heating elements at the top of the toasting zones are energized in anticipation of the arrival of the bread to be toasted.

Figure 7:
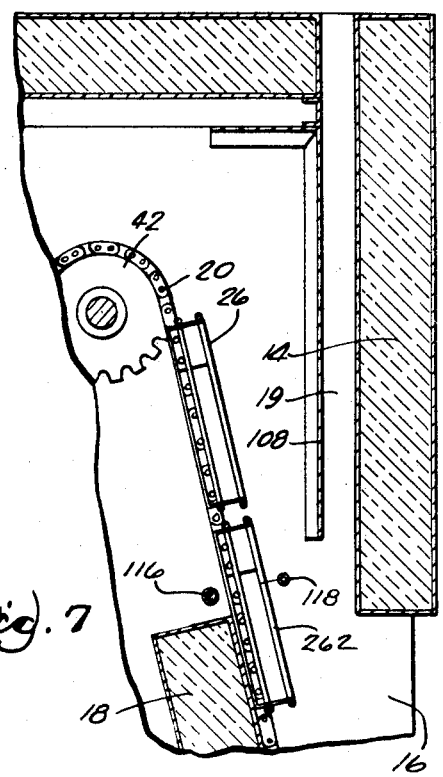
FIG. 7 is another fragmentary view similar to FIG. 1 showing a different embodiment of the invention.

FIG. 7 shows a further modified embodiment in which a special heating element 116 is located at one side of the path of the conveyor and a thermostat 118 is located at the other. The skeletonized baskets of the conveyor do not appreciably obstruct radiation of heat from the element 116 to the thermostat 118 but if one such basket contains a slice of bread, the radiant heat is obstructed and the thermostat 118 thereupon cools and energizes the heating elements at the top of the toasting zone in anticipation of the arrival of the bread slice.

In the arrangements shown in FIGS. 6 and 7, the thermostat 74 will also be used, if only to maintain desired temperature in the top of the cabinet. The anticipatory controls by thermostats 110 or 118 are, therefore, supplemental.

I claim:
1. A toaster for bread and the like comprising the combination of an endless conveyor having upper and lower guide means about which the conveyor is trained, said conveyor having means for supporting bread to be toasted, of a cabinet having front, rear, side and top walls and having its front wall provided with an opening materially below said top guide means and at which said supporting means is exposed to receive bread, means providing a toasting zone in an upper portion of the cabinet, and a hot air flue having an inlet near the front opening and materially below said top guide means and extending thence upwardly for the discharge of heated air from a level in said cabinet materially below the top guide means.

2. A toaster according to claim 1 in which the said walls are insulated throughout the upper portion of the cabinet.

3. A toaster according to claim 1 in which the lower guide means comprises spaced front and rear guides, the rear guide being substantially below the top guide means and the conveyor having an inclined run from the front guide means to the top guide means, said cabinet having an inclined panel behind the inclined run of the conveyor and extending throughout a substantial portion of the height of the opening in the front cabinet wall.

4. A toaster according to claim 1 in which toasting resistance elements are disposed along the path of movement of the conveyor between the top guide means and the bottom guide means, and in further combination with means including an anticipatory thermostat having operative means for energizing such resistance elements in advance of exposure of bread thereto.

5. A toaster according to claim 1 in which the conveyor has means operable entirely from in front of the cabinet for advancing the conveyor to advance the movement of bread to the toasting zone.

6. A toaster according to claim 5 in which the conveyor comprises at least one endless chain and the advancing means comprises a carriage mounted for movement with and against the direction of movement of the conveyor and having a sprocket in permanent mesh with the conveyor chain and provided with one-way clutch means for permitting the sprocket to rotate only when the carriage is moved in opposition to the direction of conveyor advance.

7. In a toaster for bread and the like, the combination with upper and lower guide means and an endless conveyor trained about said guide means and having bread supports, said upper and lower guide means defining a downward path of movement of said supports between the upper guide means and the lower guide means, toasting radiant heaters disposed in a series along said path and having control connections including a thermostat, said thermostat being on the side of said path opposite from the series of heaters, whereby the movement of bread on one of said supports between the thermostat and the series of heaters will affect the functioning of the thermostat, and means for driving the conveyor and including means for regulating conveyor speed for determining the period of bread exposure to radiant heat from said heaters and thereby controlling degree of toasting.

8. A toaster according to claim 7 in which radiant heaters are in two series at opposite sides of the path of conveyor and bread descent from the upper guide means to the lower guide means, the thermostat being disposed above one of the series of heaters and adapted, in the absence of intervening bread, to receive radiant heat from a heater of the other series.

9. A toaster according to claim 7 in which the upper guide means for the conveyor, and a substantial portion of the conveyor and its bread support means, are enclosed within a cabinet having a front wall provided with an opening through which bread may be inserted onto the supporting means of the conveyor, and means providing a flue having an inlet in close proximity to the upper part of said opening, said thermostat being exposed to air trapped in the upper portion of said cabinet and having convection movement toward said flue.

10. A toaster according to claim 7 in which the cabinet has a venting flue for heated air and ambient air and the thermostat is disposed within the flue, bread on the conveyor tending to obstruct convection movement of hot air from within the cabinet toward the flue whereby the flue receives an increasing portion of air from said opening, the temperature to which the thermostat in the flue is exposed being thereby reduced to effect the energization of the heaters controlled thereby.

11. A toaster according to claim 7 in which said thermostat is disposed at one side of an ascending run of said conveyor in its movement toward said upper guide means, and a separate heater is disposed at the opposite side of said conveyor run, whereby bread passing with the conveyor between the thermostat and said separate heater intercepts radiation from said separate heater and cools the thermostat to effect anticipatory energization of the toasting heaters controlled by the thermostat.

12. A toaster according to claim 7 in which the conveyor has a driving shaft and a sprocket having an overrunning clutch mounting it from said shaft and meshing with said conveyor, said clutch being overrunning in a direction to permit the conveyor to be advanced at a rate faster than the rate to which it is driven normally by said shaft, the cabinet having guide means extending along the path of the conveyor in proximity to said opening, and a manually operable carriage reciprocable along the guide means and having a sprocket permanently meshing with said conveyor chain, the sprocket having a controlling dog mounted on the carriage for locking the sprocket against rotation to require movement of the conveyor chain with the carriage when the carriage is moved in an upward direction, said dog permitting sprocket rotation during the lowering movement of the carriage whereby the carriage is movable independently of the conveyor in a lowering direction notwithstanding permanent mesh of said sprocket with the conveyor chain.

13. A toaster including a cabinet having an opening in the lower portion of its rear wall, and an opening in its forward wall, radiant heating means within the cabinet, means including a conveyor having means for supporting bread to be toasted, means defining a path of conveyor movement to carry bread past said radiant means, said conveyor including lower guide means and being adapted to discharge bread toasted in passing said radiant means, and a plate tiltably mounted about a transverse axis in the lower part of the cabinet and positioned beneath the lower guide means of the conveyor to receive toast discharge by the bread supporting means as the conveyor passes about the lower guide means, said tiltably mounted plate being adapted to deflect selectively in a forward and rearward direction toward the respective openings the toast discharged from the conveyor.

14. A toaster according to claim 13 in which a toast-receiving slide is movable forwardly and rearwardly between said openings and has linkage connecting it with said plate to tilt said plate to deliver toast in the direction toward which said slide is moved.

References Cited

UNITED STATES PATENTS

| | | | |
|---|---|---|---|
| 1,773,109 | 8/1930 | McCaig et al. | 99—386 XR |
| 2,028,944 | 1/1936 | Morrison | 99—386 |
| 2,032,272 | 2/1936 | Feltman | 99—386 |
| 2,038,028 | 4/1936 | De Matteis | 99—386 |
| 2,172,194 | 9/1939 | Ehrgott | 99—386 |
| 2,264,611 | 12/1941 | Bemis. | |
| 2,705,913 | 4/1955 | Bloom | 99—386 XR |
| 2,867,163 | 1/1959 | Bloom | 99—386 |

BILLY J. WILHITE, *Primary Examiner.*